United States Patent
Burmester

(10) Patent No.: US 6,178,986 B1
(45) Date of Patent: Jan. 30, 2001

(54) DOUBLE SEAT VALVE WITH CLEANABLE SEATS

(75) Inventor: Jens Burmester, Grambek (DE)

(73) Assignee: Tuchenhagen GmbH, Büchen (DE)

( * ) Notice: Under 35 U.S.C. 154(b), the term of this patent shall be extended for 0 days.

(21) Appl. No.: 09/341,715

(22) PCT Filed: Jun. 24, 1997

(86) PCT No.: PCT/EP97/03306

§ 371 Date: Jul. 16, 1999

§ 102(e) Date: Jul. 16, 1999

(87) PCT Pub. No.: WO98/41786

PCT Pub. Date: Sep. 24, 1998

(30) Foreign Application Priority Data

Mar. 18, 1997 (DE) ............................................. 197 11 077

(51) Int. Cl.⁷ ............................. F16K 11/20; B08B 9/027
(52) U.S. Cl. .................. 137/240; 137/312; 137/614.18; 134/166 C
(58) Field of Search .......................... 134/166 C, 166 R; 137/240, 312, 614.17, 614.18, 614.19

(56) References Cited

U.S. PATENT DOCUMENTS

| 4,304,251 | * | 12/1981 | Schadel et al. | 137/240 |
| 4,360,039 | * | 11/1982 | Jepsson | 137/240 |
| 4,373,545 | * | 2/1983 | Knappe | 137/614.18 |
| 4,460,014 | * | 7/1984 | Mases et al. | 137/240 |
| 4,605,035 | * | 8/1986 | Rasmussen et al. | 137/240 |

(List continued on next page.)

FOREIGN PATENT DOCUMENTS

| 501350 | 6/1930 | (DE) . |
| 38 01 561 | 8/1989 | (DE) . |
| 38 35 944 | 4/1990 | (DE) . |
| 0 039 319 A1 | 4/1981 | (EP) . |
| 0 174 384 | 3/1986 | (EP) . |
| 0 646 741 | 4/1986 | (EP) . |
| 0 545 846 | 6/1993 | (EP) . |
| WO 95/087300 | 3/1995 | (EP) . |
| 1204043 | 8/1959 | (FR) . |
| 668563 | 3/1949 | (GB) . |
| 7 811 382 | 5/1979 | (NL) . |

\* cited by examiner

Primary Examiner—George L. Walton
(74) Attorney, Agent, or Firm—Venable; John P. Shannon

(57) ABSTRACT

The invention relates to a double seat valve with cleanable seats comprising two closure members which are placed in series and which can be moved in relation to one another, in accordance with the generic part of claim 1. The aim of said double seat valve is to provide a double seal with a tight leakage cavity in relation to the valve housing part which is closed off by the second closure ember when the seat of the first closure member is being cleaned, said first closure member being ventilated across the width of the gap, along its seat surface, in accordance with the sealing concept of a double seat valve. To this end, the end section of the sliding piston (4) has two axially arranged radial sealing agents (6 and 7) in relation to its longitudinal axis. Outlets (4b) are provided in said sliding piston (4) between said sealing agents. Said outlets connect the area surrounding the sliding piston (4) to the leakage cavity (11) on the outer covering side. When the double seat valve is closed, both sealing agents (6, 7) are accommodated tightly in the cylindrical valve seat surface (3a) and when open, said sealing agents are taken into the recess (9). When the sliding piston is in the seat cleaning position, it is shifted towards its open position in such a way that the outlets (4b) are connected to the valve housing part (2; 1) adjacent to the seat surface which has become free, thereby ensuring that the sliding position (4) sealing agent (7) on the leakage cavity side in the cylindrical valve seat surface (3a) remains tight.

17 Claims, 4 Drawing Sheets

U.S. PATENT DOCUMENTS

Figure 1:
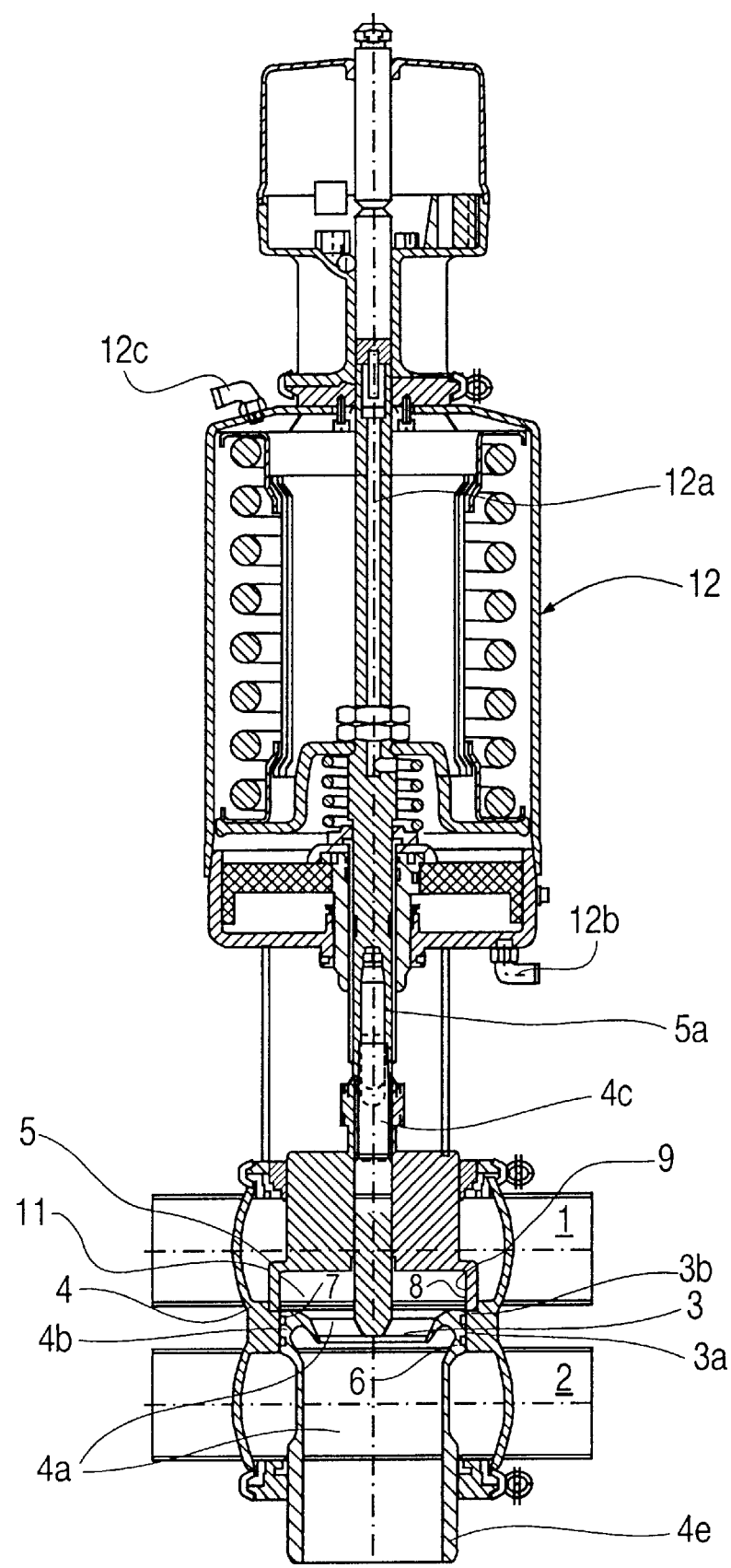

| | | | |
|---|---|---|---|
| 4,617,955 | * | 10/1986 | Melgaard ............................. 137/240 |
| 4,655,253 | * | 4/1987 | Ourensma ............................ 137/240 |
| 4,687,015 | * | 8/1987 | Mieth ................................... 137/240 |
| 4,757,834 | * | 7/1988 | Mieth ................................... 137/240 |
| 4,995,416 | * | 2/1991 | Mieth ................................... 137/312 |
| 5,085,241 | * | 2/1992 | Mieth .............................. 137/614.18 |
| 5,575,305 | * | 11/1996 | Mieth ................................... 137/240 |
| 5,645,102 | * | 7/1997 | Brackelmann et al. ............. 137/240 |
| 5,806,554 | * | 9/1998 | Mieth ................................... 137/240 |
| 6,014,983 | * | 1/2000 | Sondergaard et al. ............... 137/240 |

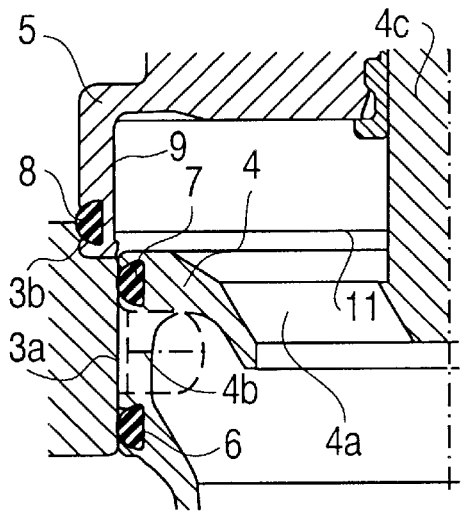
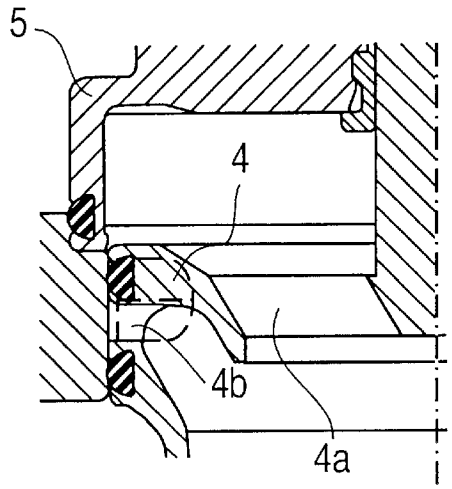
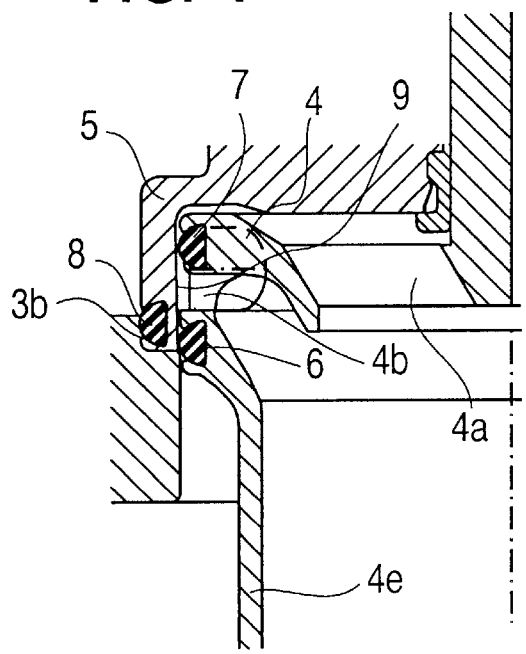
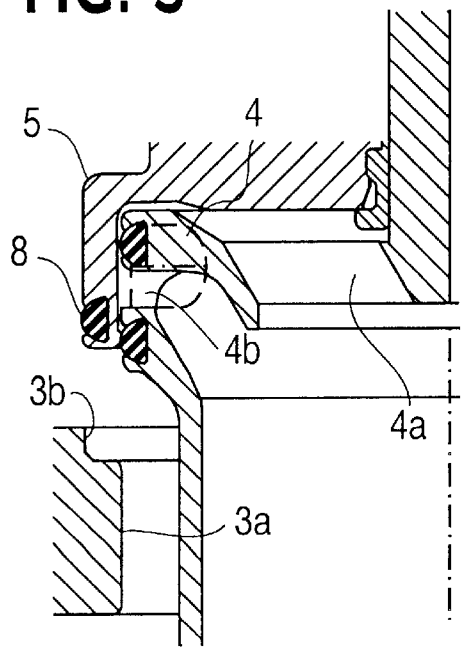

DOUBLE SEAT VALVE WITH CLEANABLE SEATS

The invention relates to a double seat valve with cleanable seats with two closure members mounted in series and movable relative to each other, as described in the preamble of claim 1.

A generic double seat valve is known, for example, from EP-A-0 174 384. This valve presents the disadvantage that in order to clean the seat surface of the closure member in the form of a slide valve, the valve piston, the circumferential groove provided in the other closure member (see FIGS. 2a–3d) or in the cylindrical valve seat (see FIGS. 4a–4d), into which member the sealing agent of the slide valve piston must be brought in an intermediate position in order to effect seat cleaning, must also be passed during each regular opening or closing movement of the double seat valve. As a result, penetration of liquid, which is desirable in the case of seat cleaning but not in the normal alternating movement of the double seat valve, occurs during each of these movements.

DE 38 35 944 A1 discloses another double seat valve whose seats may be cleaned, one in which, in contrast to the generic double seat valve, the slide valve rests only against the other closure member to effect sealing, before the latter is also transferred to the open position. For the purpose of cleaning the seat surface of the slide valve piston, this slide valve piston is transferred to a seat cleaning position by the amount of a partial stroke in the direction of its open position to the width of a gap. With this double seat valve the regular opening and closing movement does remain unaffected by the measures applied for seat cleaning, it is difficult to measure and limit to the absolute minimum necessary for elimination of fouling in the seat area the amount of cleaning means obtained in each instance from the associated valve housing element for cleaning the valve seats by gap-wide actuation of the closure members. But in order nevertheless to ensure economical and environment friendly use of cleaning agents, it is proposed in DE 38 35 944 A1 that the valve disks be actuated in cycles.

In another state-of-the-art cleanable-seat double seat valve (EP-A-0 646 741), the amount of cleaning means to be prepared for cleaning the valve seats is limited by the fact that the slide valve piston element involved rests against a housing stop provided with flushing means apertures when in the pertinent flushing position. Consequently, in this state-of-the-art double seat valve there are areas that cannot be wetted with cleaning means during the flushing process unless this valve as well is cleaned periodically, to be sure because of the disadvantage indicated above.

In the case of the known double seat valves referred to above cleaning means introduced by way of the cleared seat surface from the adjacent valve housing element can impinge on the other valve seat area with more or less high kinetic energy when the latter is in its closed position. This can occasionally result in penetration of the closed sealing area by cleaning means. A particular danger is then caused if the pertinent seal has undergone extensive wear as a result of which the reduced sealing pressure can no longer ensure a sufficient sealing effect because of the action of the kinetic energy of the spray stream.

In addition, there is set for cleanable-seat double seat valves the requirement that cleaning means flowing into the leakage cavity during seat cleaning be drained into the vicinity of the double seat valve free of pressure, that is, with no pressure buildup in the leakage cavity. The double seat valves referred to above (DE 38 35 944 A1 and EP-A-0 174 384) could only with great difficulty meet the requirements set in this connection, since, on the one hand, the possibility of concise measurement of the pertinent amount of cleaning means is not obvious, and, on the other, the discharge cross-sections cannot be suitably adapted to the increased supply of cleaning means.

In the United States of America there is even set for the double seat valves employed in dairy industry installations the requirement that no cleaning means may flow by way of an unsealed valve seat into the adjacent valve housing element in the event of major defects in seals or even absence of such seals. Even if it is possible to measure out the extremely small amount of cleaning means used in seat cleaning, as apparently is the case with the state-of-the art double seat valve disclosed in EP-A-0 646 741, direct spray application in this instance to one of the two seat areas would in the event of a major seal defect or loss of the seal result in penetration of cleaning liquid into the adjacent valve housing element. Such a situation would arise at least on the lower valve seat in flushing of the upper seat area (cf. FIG. 2c of EP-A-0 646 741) if there is a major seal defect or even loss of the seal has occurred here. For this reason use of the cleanable seat double seat valves referred to in the foregoing has been rejected, at least in the dairy industry.

Absolutely pressure-free removal of amounts of liquid from the leakage cavity, leaks due either to sealing defects or amounts of cleaning means used in any type of cleaning of the leakage cavity or seat cleaning, desirable because necessary, is a requirement which has been gaining in importance recently, especially on the United States market or in the American area of influence in use of double seat valves and there especially in dairy technology. What is involved here is compliance with the United States so-called "3A Standard" and the so-called "FDA Regulations," which state that the leakage space is to be connected to the atmosphere so as to be drainable with a cross-section corresponding to the rated value of the largest pipe connected to the valve.

On the one hand, cleanable-seat double seat valves are increasing in importance because seat areas can thereby be cleaned even if cleaning means is present in only one of the valve housing elements and, if desired, product is still applied to the other, that is, if the valve cannot be fully opened for the purpose of cleaning its seat areas, and, on the other, the safety philosophy of the double seat valve, specifically, that cleaning means and product present under pressure in the valve must not be separated from each other by only one seal, is always inoperative during seat cleaning. Similarly, by the way, the safety philosophy of the double seat valve is always avoided if the leakage cavity is cleaned with the double seat valve in the closed or open position by external delivery of the cleaning means from the vicinity of the double seat valve. Outside the United States' sphere of influence in the case of cleaning a leakage cavity with the valve open or closed and during seat cleaning, the requirements deriving from the double seat valve safety philosophy have thus far not been consistently and stringently complied with because it is assumed that, if the connecting path between the leakage cavity and the vicinity of the double seat valve is properly measured, the cleaning means on the closed valve seat is not under pressure and because, in addition, no other solution of the problem is available.

On the basis of the disadvantages of the state of the art described in the foregoing, the object of this invention is to develop a cleanable-seat double seat valve in which, for the purpose of consistent implementation of the double seat valve safety philosophy, dual sealing secured by a leakage cavity from the valve housing element closed by the other closure member is provided in each instance in the course of seat cleaning of the closure member separated by the width of a gap from its seat surface.

This problem is solved by the features set forth in claim 1. Advantageous embodiments of the proposed cleanable-seat double seat valve are described in additional subsidiary claims.

The proposal shows how double sealing can be accomplished in a surprisingly simple manner under the conditions described. For this purpose a generic double seat valve at least the essential features of which are known from EP-A-0 174 384, for example, as regards the basic closure member configuration, is provided on the end section of the smaller closure member designed as a slide valve (slide valve piston as active closure member), referred to its longitudinal axis, with two radially spaced sealing agents. Provided between these in the slide valve piston are outlet openings which connect the vicinity of the slide valve piston on the jacket surface side to the leakage cavity which is formed between the two closure members when the double seat valve is both in the closed and the open position. The leakage cavity is connected to the vicinity of the closure members, the connection being in the form of a tubular shaft connected to the closure members, which shaft extends through the associated valve housing elements and ends in this vicinity.

In addition to a primary regulating mechanism for opening and closing the double seat valve there is also provided for each closure member an associated individual regulating mechanism by means of which the closure members may be transferred by a partial valve stroke to a pertinent seat cleaning position. Seat cleaning of the slide valve piston, which is designed to be smaller than the second closure member (passive closure member), is effected in that the slide valve piston is displaced by the amount of a partial valve stroke against the direction of its opening movement, to the extent that the outlet openings are connected to the now cleared seat surface of the adjacent valve housing element and the sealing agent of the slide valve piston on the cavity side remains in the cylindrical valve seat surface and effects sealing. In this position the cleaning means can now reach the cleared seat surface and drain through the outlet openings into the leakage cavity. Since the sealing agent of the slide valve piston leakage cavity side and the sealing agent of the second closure member remain in their closed sealing position, double sealing exists between the cleaning means applied to the cleared seat surface and the other closed valve housing element, in which double sealing of the leakage cavity connected to the vicinity is active.

The seat of the second closure member is cleaned by being displaced in the direction of its normal opening movement until the associated seat surface has been cleared and is accessible to the cleaning means from the adjacent valve housing element. The slide valve piston remains in it is closed position, double sealing by way of the two axially spaced sealing agents in the slide valve piston also now existing between the cleaning means flowing over the cleared seat surface and the valve housing element closed by the slide valve piston. In this instance as well the leakage cavity connected to the external environment by way of the proposed outlet openings in the slide valve piston between the two sealing agents is also active.

In the two seat cleaning positions described in the foregoing, the area between the two sealing agents in their closed sealing position is in each instance connected to the leakage cavity. This ensures that, in the event of a defect in the sealing agent adjacent to the cleaning liquid and in its closed position, no pressurized cleaning means will be present on the sealing agent of the other closure member, which is also in its closed position. Since not only are the outlet openings in their entirety dimensioned so as to comply with the United States regulation referred to above or may easily be brought into such compliance, but also the connecting path between the leakage cavity and the external environment of the valve is or can be so dimensioned, pressure free drainage into the external environment is ensured for amounts of cleaning means which may become present as a result of defective sealing agents in the course of seat cleaning.

The essential features of the proposed seat-cleanable double seat valve may be applied advantageously to two different double seat valve designs. A first design is characterized in that there is mounted on one side of the slide valve piston the tubular shaft which extends through the valve housing element adjacent to the latter into the vicinity of the double seat valve and receives a discharge outlet which extends through the slide valve piston into the leakage cavity and connects the latter to the vicinity of the double seat valve. On the other side there is fastened to the slide valve piston a valve rod which extends through the valve housing element adjacent to this side and is connected to a double seat valve drive unit. This double seat valve design includes a valve which is open in the direction of the drive unit side and whose closure members are also expandable in this direction and in which leakage and the cleaning means present during seat cleaning may be discharged toward the other side by way of the drain outlet.

A second double seat valve is characterized in that there is mounted on one side of the second closure member the tubular shaft which extends through the valve housing element adjacent to the latter into the vicinity of the double seat valve and receives a drain outlet which extends through the second closure member into the recess in the latter, which forms a part of the leakage cavity and connects the latter to the vicinity of the double seat valve. The other side of the second closure member is engaged by a valve rod which extends through a valve housing element adjacent to this side and is connected to a drive of the double seat valve. If this double seat valve design has, as is proposed, a so-called seat ring detachable from the valve housing elements, inside which the cylindrical valve seat surface for the slide valve piston is provided, a double seat valve is available which opens in a direction away from the drive unit and in which the closure members may be removed in the direction of the drive unit under the conditions indicated below. Leakage and the cleaning means present in seat cleaning are discharged in the direction of the opening movement of the valve, into the vicinity of the latter. In order to ensure detachability of the closure members as described in the foregoing, it is proposed that the seat ring be seated externally in a connecting hole which joins the valve housing elements together, that it be sealed there by a first and a second seat ring seal, that it be mounted in the valve housing elements on the drive unit side, and that its smallest external diameter be larger than the largest external diameter of the second closure member.

In the case of the two double seat valve designs referred to above the preferred installed position selected is such that the discharge outlet is oriented more or less vertically downward, so that leakage and the cleaning means present during seat cleaning may be discharged downward by the effect of the force of gravity. In addition, the two closure members may be in the form of slide valve pistons with a radial sealing agent, the active slide valve piston always being designed to be smaller than the passive one (EP-A-0 174 384, FIGS. 3a–3d; EP-A-0 646 741). It is also possible, however, to design the passive closure member as a seat disk (EP-Q-0 174 384, FIGS. 4a–4d; DE 38 35 944 A1). From the viewpoint of the preferred installed position, a double seat valve opening downward and expandable upward, regardless of whether designed with two slide valve pistons or one slide valve piston and a seat disk, requires the seat referred to above, such as has long been known in principle, from DE-PS 501 350 for example.

With respect to the preferred installed position a double seat valve opening downward and expandable upward has over the version opening upward the advantage that the connecting hole between the two valve housing elements in which the cylindrical valve seat surface is formed may be smaller in diameter. This is due to the fact that, when the valve is in the open position, only the valve rod of the slide valve piston extends through the connecting hole and not the tubular shaft in which the discharge outlet is to be positioned. In the case of the latter the need exists in certain applications of providing it with the largest possible passage cross-section.

The proposed outlet openings may on the whole easily be sized so that the requirement of the United States "3A Standard" and of the "FDA Regulations" can be met without restriction. For this purpose the openings are to be designed so that on the whole they have at least one passage cross-section corresponding to the cross-section of the largest pipe connected to the valve.

So that no constriction will occur anywhere along the total connecting path, from the discharge openings by way of the leakage cavity into the vicinity of the double seat valve, it is further proposed that over its entire length the discharge outlet have a passage diameter corresponding to that of the largest pipe connected to the valve.

The proposed double seat valve provides two fundamental designs insofar as interaction of the double slide valve piston and the second closure member with the double seat valve in the open position is concerned. In a first embodiment, one end section of the slide valve piston provided with the two axially spaced sealing agents is introduced into the recess in the second closure member before the latter opens. Both sealing agents are received there and effect sealing. The proposed double seat valve makes use here of a feature known, for example, from GB-A-668 563 (in particular FIGS. 15 and 16) or from FR-A-1 204 043, which feature provides that the end section of the slide valve piston is moved with its sealing agent during the opening movement of the valve into a recess in the second closure member and is protected there by a circumferential wall of the recess from the effect of the fluid impinging on the valve and is reinforced before the second closure member opens.

In a second embodiment only the sealing agent on the side of the leakage cavity immediately adjacent to the front end of the slide valve piston is introduced into a recess in the second closure member, without there effecting sealing against a circumferential wall of the recess, while the other sealing agent of the slide valve piston comes into contact only with the end of the second closure member surrounded by the recess and effects sealing. Such contact may be established radially, radially/axially, or axially (if there is sufficient elastic restoring deformation of the sealing agent after leaving the cylindrical valve seat) relative to the sealing agent. What is accordingly involved with the sealing processes indicated is not introduction of the seal into the recess but a so-called external "docking" on the end of the recess (in this connection see also WO-A-9508730).

The circumstance that the sealing agent introduced into the recess is enclosed by the circumferential wall with a circumferential ring gap may be used to advantage to subject this sealing agent to cleaning with the valve in the open position. For this purpose, for example, cleaning means is introduced from outside the double seat valve by way of a ring gap formed between the valve rod and a hollow rod enclosing the latter and is introduced into the circumferential ring gap in question for the purpose of washing the sealing agent indicated, from which gap it is then delivered by way of the passage openings between the two sealing agents mounted in the slide valve piston into the leakage cavity and from this point by way of the discharge outlet into the external environment. The cleaning means may alternatively also be delivered by way of a connecting hole mounted in the internal valve rod.

In order to measure and limit the amount of cleaning means in the course of a particular seat cleaning, it is proposed that the slide valve piston have, between the sealing agent on the valve housing side and the discharge opening a more or less cylindrical extension which externally forms a throttle ring gap with the cylindrical valve seat surface.

As regards the second closure member, it is provided in this connection that on its end enclosing the recess this member have a more or less cylindrical extension which externally forms a throttle ring gap with a second valve seat surface.

To the extent that they are characterized by interaction of the slide valve piston and the second closure member with the double seat valve in the open position and are described by the example of the two preceding embodiments, the proposed fundamental solutions may also be applied to a double seat valve in which the opening movement takes place downward relative to the preferred installed position (the second double seat valve described in the foregoing). The independently actuated closure member (active closure member) is in this instance mounted in the form of a slide valve piston above the dependently actuated closure member (passive closure member). The former comes as it performs its opening movement downward to rest against the other and transfers it to the open position as well. In the process both closure members may be in the form of slide valve pistons with radial sealing agents, as is the case with the two embodiments described above (e.g., recess as described in EP-A-0 174 384, FIGS. 3a–3d), or rather an embodiment as disclosed in EP-A-0 646 741 is employed. It is also possible, however, to select a closure member configuration with a slide valve piston and a seat disk as disclosed by references EP-A-0 174 384, FIGS. 4a–4d, or EP-A-0 039 319, FIGS. 1 and 2, these closure member configurations being mirrored by a horizontal axis in application to the present invention.

In order to ensure detachability upward with a closure member configuration having one closure member in the form of a slide valve piston and one in that of a seat disk, on the other hand, the seat element or seat ring referred to previously (see DE-PS 501 350) may be provided.

In addition, an additional embodiment is proposed which applies the inventive concept of double sealing in the case of seat cleaning, but the central sealing agent of the three applied, the one on the leakage cavity side, is mounted in an independent element of the slide valve piston which is designed to be mobile relative to the remainder of the slide valve piston and which one on side rests against the latter and on the other side against the second closure member, either directly or indirectly under the pressure of a spring. In the process this third closure member between the other two has limited mobility, it being so to speak "carried along" in the opening and closing process by pressure applied on both sides but without spring loading on both sides. In addition, provision has also been made such that the independent element of the slide valve piston receiving the sealing agent on the leakage cavity side is connected to the drive of the double seat valve and may be controlled there. In both seat cleaning positions the independent element in question is mounted so that its sealing agent assumes the function of the second sealing agent on the leakage cavity side of the embodiments described in the foregoing.

The sealing agents of the slide valve piston are designed for each of the embodiments and structures described above as self-contained seals or are produced by coating or jacketing the end section in question of the slide valve piston with a suitable sealing material. Provision is also made such that at least the end section in question of the slide valve piston consists in its entirety of a suitable sealing material.

The double seat valve provided with the features described above as claimed for the invention may be applied without restriction to all previously known utility and functional versions of double seat valves, such as embodiment as a so-called tank bottom valve, in which case the tubular shaft on the slide valve piston with a discharge outlet mounted in it is omitted. The latter is provided rather in a tubular shaft mounted on the second closure member. In this instance the slide valve piston is opened in the direction of the leakage cavity so that a full-width connection exists between the outlet openings beyond these openings and is determined by these openings further along the passage cross-section.

Figure 6:
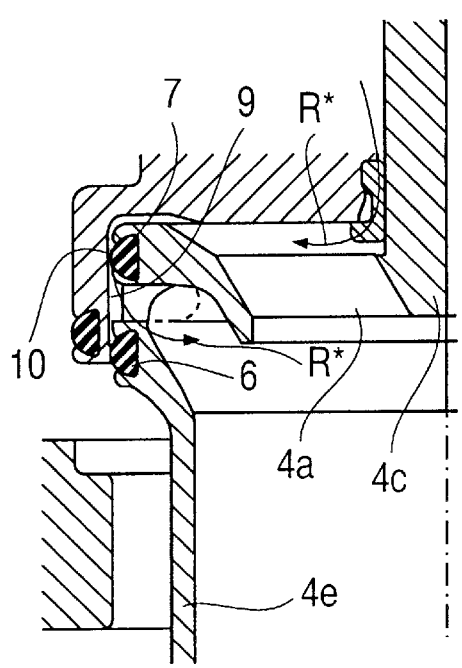
Figure 6A:
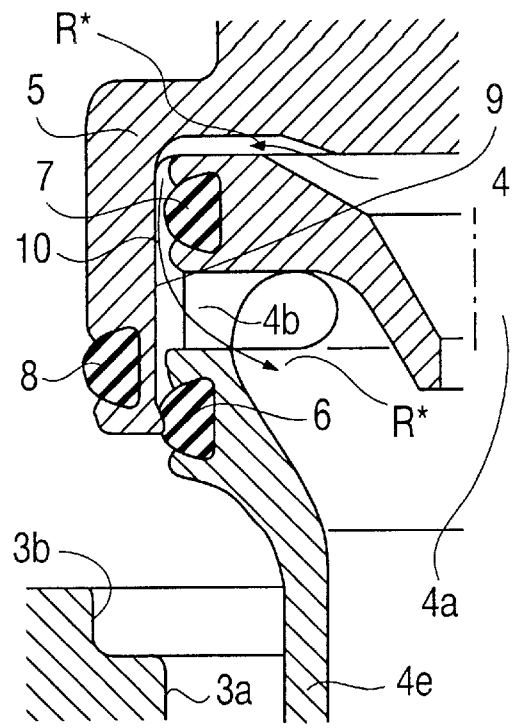
Figure 7:
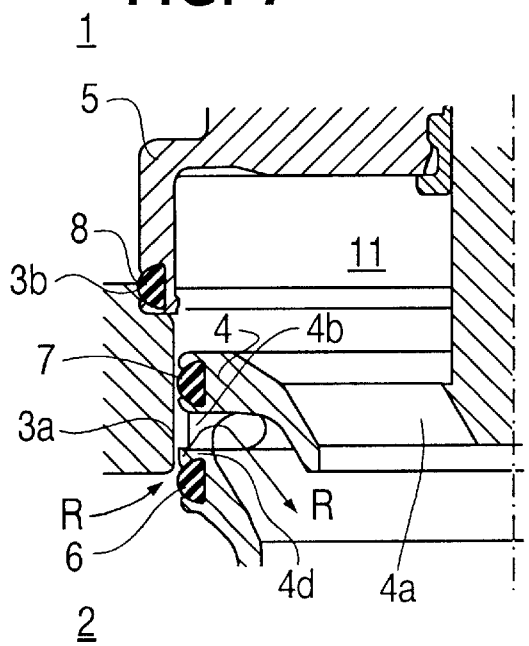
Figure 8:
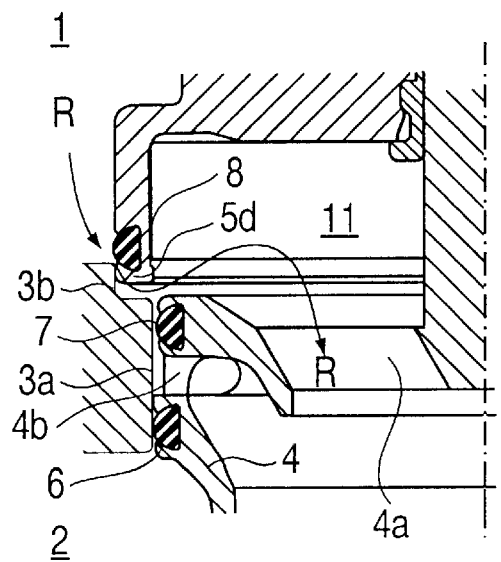
Figures 9, 9A:
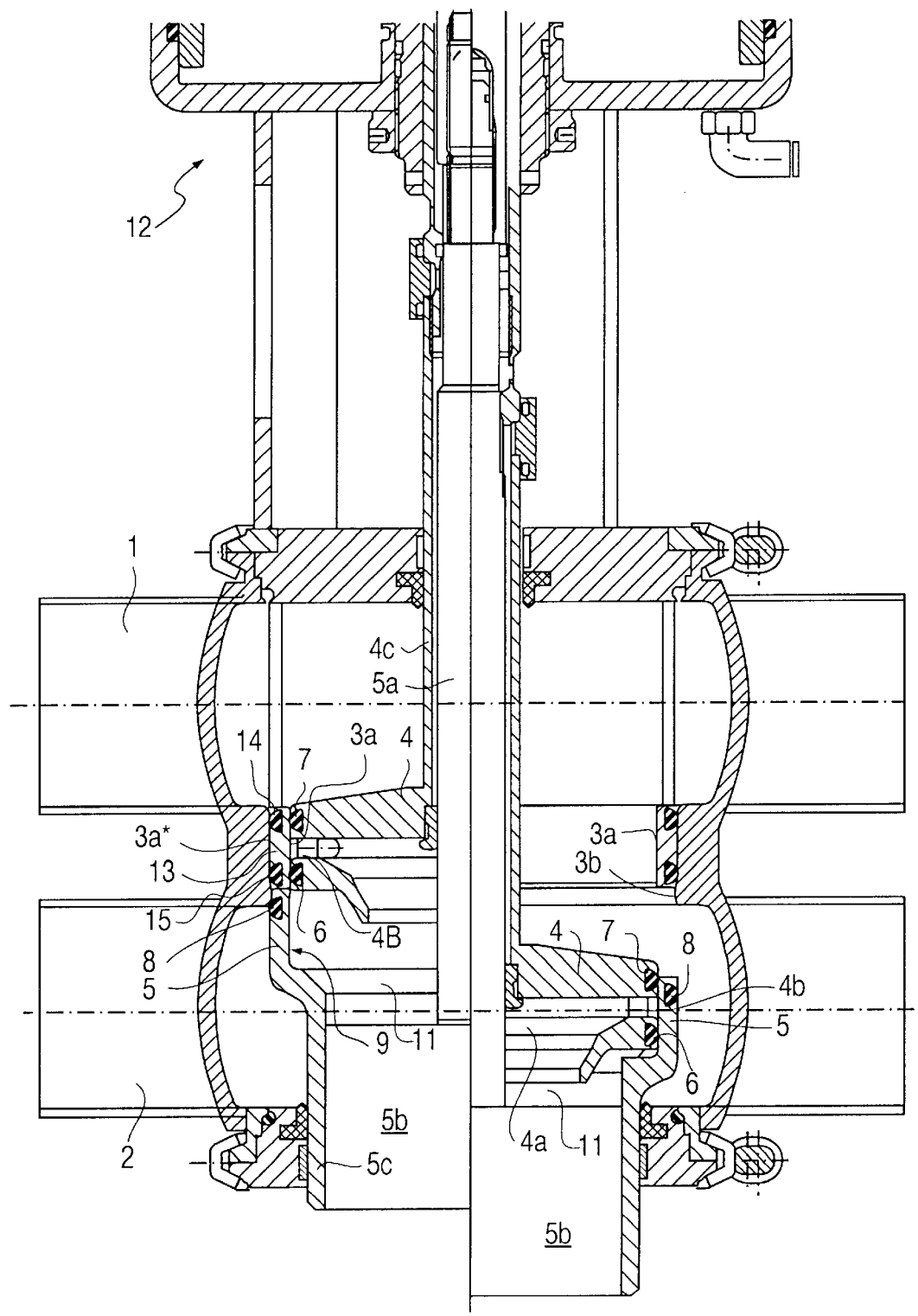

Embodiments of the invention are illustrated in the drawing and are described in what follows. In the drawing FIG. 1 shows a cross-section through a first embodiment of the proposed double seat valve of a first design in its closed position;

FIG. 2 an enlarged cutaway view of the seat areas of the two closure members, the closed position of the double seat valve being shown and the passage cross-section of the outlet openings in the aggregate corresponding to a cross-section corresponding approximately to the rated width of the largest pipe connected to the valve;

FIG. 3 the view as presented in FIG. 2, the outlet opening having a smaller passage cross-section than that shown in FIG. 21;

FIG. 4 an enlarged view of the seat area of the valve shown in FIG. 3, the closure members assuming a so-called intermediate position in which the first closure member, the slide valve piston, is received into the second closure member before the latter opens;

FIG. 5 the closure members illustrated in FIG. 3 with the double seat valve in the open position;

FIG. 6 a cutaway view on a larger scale of the two closure members in a second embodiment, the closure members being in their open positions and a circumferential gap being provided between the sealing agent received into the recess and the circumferential wall of the recess;

FIG. 6a an enlarged view of the layout illustrated in FIG. 6, in the area of the recess;

FIG. 7 the closure members of the double seat valve in the first embodiment illustrated in FIG. 3, the slide valve piston having been transferred to its seat cleaning position;

FIG. 8 the closure member layout illustrated in FIG. 3, the second closure member having been moved to its seat cleaning position;

FIG. 9 a second advantageous design of the proposed cleanable-seat double seat valve in its closed position, in which the closure members open downward relative to the preferred installed position but are removable upward, in the direction of the drive, in conjunction with a seat ring; and FIG. 9a the cleanable-seat double seat valve shown in FIG. 9 in its open position.

The double seat valve consists in its first design (FIG. 1) of a first and a second valve housing element 1 and 2. The two are connected to each other by way of a connecting hole 3 which internally forms the cylindrical seat surface 3a. A first closure member 4 (active closure member) in the form of a slide valve piston is received into the valve seat surface 3a and effects sealing when the double seat valve is in the closed position. On one end section of the slide valve piston 4 there are provided, relative to its longitudinal axis, two axially spaced radial sealing agents 6 and 7, designated henceforth as valve housing side sealing agent 6 and leakage cavity side sealing agent 7 respectively. A second closure member 5, also in the form of a slide valve piston, is received, when the double seat valve is in the closed position, onto a second valve seat surface 3b, which is also designed so as to be more or less cylindrical; opposite this seat surface it is sealed by a third, radially acting, sealing agent 8. The second closure member 5 may also be designed as a seat disk with axially acting sealing agent 8 (as illustrated, for example, in EP 0 174 384, FIGS. 4a–4d, or EP 0 039,319, FIGS. 1 and 2).

The two closure members 4 and 5, both in the closed position shown and in the open position, form between them a leakage cavity 11, which is connected to the vicinity of the double seat valve by way of a discharge outlet 4a mounted in a tubular shaft 4e of the slide valve piston 4.

The slide valve piston 4 is connected to a valve rod 4c which extends upward out of the first valve housing element 1 and into a drive unit 12. The valve rod is enclosed concentrically in a tubular hollow rod 5a which on one side is connected to the second closure member 5 and on the other also extends into the drive unit 12. The drive unit 12 has a primary regulating mechanism not described in detail by means of which the double seat valve may be opened and closed. The process of opening and closing the double seat valve is effected by delivering pressure means, preferably compressed air, to the drive unit 12, and withdrawing it from the drive unit 12 by way of a pressure means hole 12a made in the valve rod 4c. In order to open the valve the slide valve piston 4 is introduced into a recess 9 in the second closure member 5, comes to rest against the latter and transfers it also to the open position during its continued opening movement. Transfer of the closure members 4, 5 to the pertinent closed position of the double seat valve takes place analogously in the opposite order.

For the purpose of lifting the closure members 4 and 5 by the width of a gap from their respective seat surfaces 3a and 3b there are provided in the drive unit 12 individual regulating mechanisms not shown in greater detail which engage first the valve rod 4c (actuation by way of a pressure means connection 12c for moving the valve rod 4c downward and thus for carrying out seat cleaning of the slide valve piston 4) and secondly the hollow rod 5a (actuation by way of pressure means connection 12d for moving the hollow rod 5a upward and thus for carrying out seat cleaning of the second closure member 5).

The proposed features claimed for the invention and their operating characteristics are explained in what follows in the context of the first embodiment of the double seat valve in its first design, with reference to FIGS. 2 to 8.

FIG. 2 shows the two axially spaced radial sealing agents, the sealing agent 6 on the valve housing side, and the sealing agent 7 on the leakage cavity side, between which are provided in the slide valve piston 4 passage openings 4b which connect the vicinity of the slide valve piston 4 on the jacket surface side to the leakage cavity 11. In the situation shown the two sealing agents 6 and 7 effect sealing in the cylindrical valve seat surface 3a, while the third sealing agent 8 in the second closure member 5 rests against the second valve seat surface 3b to effect sealing. In the second closure member 5 there is a more or less cylindrical recess 9 whose circumferential wall is designed to be equal in diameter to and in alignment with the cylindrical valve seat surface 3a.

In contrast to FIG. 2, FIG. 3 shows passage openings 4b of smaller dimensions in the slide valve piston 4, the passage openings 4b being dimensioned with a view toward compliance with the so-called United States "3A Standard" (FIG. 2) so that in the aggregate they have at least one passage cross-section corresponding to the rated cross-section of the largest pipe connected to the valve.

In the intermediate position (FIG. 4) the slide valve piston is situated with its end section in the recess 9 of the second closure member 5, where both sealing agents 6 and 7 are received in order to effect sealing. The second closure member 5 has in this position not yet left its closed location during the opening movement, so that the third sealing agent 8 is still engaged with the second valve seat surface 3b to effect sealing.

FIG. 5 shows the double seat valve in the open position. The position of the closure members 4 and 5 relative to each other has not yet changed, but the second closure member 5 with its sealing agent 8 has left the second valve seat surface 3b.

The second embodiment of the proposed cleanable-seat double seat valve of the first design (FIGS. 6 and 6a) shows that with the double seat valve in the open position the radial extent of a circumferential wall of the recess 9 in the area of it enclosing the sealing agent 7 on the leakage cavity side is designed so that a circumferential gap 10 is formed between the sealing agent 7 and the circumferential wall of the recess 9. The sealing agent 6 on the valve housing side effects sealing in the process on the end enclosing the recess 9, where exclusively axial sealing contact may be involved, radial/axial contact, or again exclusively axial contact. Introduction of the sealing agent 6 into the recess 9 on the valve housing side is in any event omitted. What is involved here is rather "docking" on the end section side of the recess 9. No particular requirements with respect to its geometric configuration need be set for the recess in its interior area. All that need be done is to make certain that the circumferential annular gap 10 between the circumferential wall of the recess 9 and the sealing agent 7 on the leakage cavity side is present. A more or less cylindrical form is no longer absolutely necessary for the recess 9 as it is, for example, for the first embodiment proposed above. The circumferential annular gap 10 between the sealing agent 7 on the leakage cavity side and the circumferential wall of the recess 9 permits rinsing and cleaning of this sealing agent 7 and of the circumferential annular gap 10 itself. For this purpose cleaning means R* is delivered to the circumferential annular gap 10, for example, from outside the double seat valve, by way of an annular gap formed between the valve rod 4c and a hollow rod 5a enclosing the latter (also see FIG. 1), or, alternatively by way of a connecting hole inside the internal valve rod 4c.

In seat cleaning of the slide valve piston 4 (FIG. 7) the latter is displaced a partial valve stroke in the direction of the associated valve housing element 2, that is, against its regular opening movement, so that the sealing agent 6 on the valve housing side is no longer engaged with the cylindrical valve seat surface 3a. cleaning means R now reaches the leakage cavity 11 by way of the cleared valve seat surface 3a and then passage openings 4b, subsequently flowing into the vicinity of the double seat valve by way of the discharge outlet 4a. The amount of cleaning means R is limited by a so-called annular throttle gap between the first cylindrical seat surface 3a and a more or less cylindrical projection 4d provided between the sealing agent 6 on the valve housing side and the passage openings 4b.

Between the flow of cleaning means R and the closed first valve housing element 1, in which product may be present if desired, in the seat cleaning position illustrated there is double sealing provided in the slide valve piston 4 by the sealing agent 7 on the leakage cavity side and the third sealing agent 8 in the second closure member 5. Against the event that the sealing agent 7 on the leakage cavity side may be defective, cleaning means R, which passes through this defective sealing point in the direction of the second closure member 5, may be drained unpressurized by way of the leakage cavity 11 and the discharge outlet 4a connected there to the latter. This eliminates impingement of the cleaning means R referred to on the third sealing agent 8.

The inverse case, in which the third sealing agent 8 is defective and any product present passes through this sealing point merely has the result that the leakage cavity 11 performs the function intended for it and drains this leakage unpressurized. Mixing of product and cleaning means is virtually excluded, since a situation such as this would arise only if the two seals involved 7 and 8 were simultaneously defective and in addition pressure-free discharge of cleaning means R or product had not been ensured. This occurrence can be reliably prevented by proper sizing of the passage cross-sections of the passage openings 4b and the discharge outlet 4a.

In cleaning of the seat of the second closure member 5 (FIG. 8) the sealing agent 8 of this closure member is separated by a gap from its associated second valve seat surface 3b. This is achieved by moving the second closure member 5 the distance of a valve stroke in the direction of its associated valve housing element 1. The slide valve piston 4 remains with its two sealing agents 6 and 7 in its closed position in the cylindrical valve seat surface 3a. Cleaning means R may now flow into the leakage cavity 11 by way of the cleared second valve seat surface 3b. In this instance as well the amount of cleaning means R is limited by a so-called annular throttle gap between the second valve seat surface 3b and a more or less cylindrical extension 5d provided on the end of the second closure member 5 enclosing the recess 9.

Should the sealing agent 7 on the leakage cavity side be defective, any cleaning means R penetrating the defect flows by way of the passage openings 4b directly into the discharge outlet 4a adjoining the leakage cavity 11, and from this point drains into the vicinity of the double seat valve, also without application of pressure to the sealing agent 6 on the valve housing side.

FIGS. 9 and 9a illustrate a cleanable-seat double seat valve of the second design, one which possesses the proposed features claimed for the invention and whose closure members 4 and 5 may be dismounted downward and upward, relative to the preferred installed location, in the direction of the drive unit. In the following description reference is made only to the essential differences from the first design shown in FIG. 1. One essential difference consists of the fact that, in a connecting hole 3a* joining the two valve housing elements 1 and 2, there is mounted so as to effect sealing by means of two seat ring seals 14 and 15 a detachable seat ring 13 inside which a cylindrical valve seat surface 3*a* is provided. Connected to the second closure member 5 is a tubular shaft 5*c* which extends through the adjacent valve housing element 2 into the vicinity of the double seat valve and receives a discharge outlet 5*b*. The latter extends into the recess 9, which forms part of the leakage cavity 11, thereby connecting the leakage cavity 11 to the vicinity of the double seat valve. The slide valve piston 4 has the two axially spaced sealing agents 6 and 7 between which are provided in the slide valve piston 4 the passage openings 4*b* which connect the vicinity of the slide valve piston 4 on the jacket surface side to the leakage cavity 11, in this embodiment illustrated by way of a central opening 4*a*\* in the front surface of the slide valve piston 4 on the leakage cavity side. The detachable seat ring 13 is mounted preferably in the valve housing element 1 on the drive unit side, its smallest external diameter being by design larger than the largest external diameter of the second closure member 5. These two last-named features ensure the desired dismountability of the closure members 4 and 5 in the direction of the drive unit by opening the valve housing element 1 on the drive unit side.

It is also to be seen (FIG. 9*a*) that, when the double seat valve is in the open position, the passage cross-section of the double seat valve is narrowed in the area of the cylindrical valve seat surface 3*a* only by the cross-section of the hollow rod 4*c*. This yields advantages in comparison to the first design of the double seat valve shown in FIG. 1, in which the corresponding passage cross-section of the double seat valve in the seat area when in the open position is reduced by the relatively large cross-section of the tubular shaft 4*e* which receives the discharge outlet 4*a*.

The slide valve piston 4 (FIGS. 9, 9*a*) may also be provided with a so-called pressure compensation piston which extends beyond the valve housing element 1 in the direction of the drive unit 12 and compensates for the forces of pressure applied to the face surface of the slide valve piston 4 in the area of the valve housing element 1.

In the double seat valve designs and their embodiments described in the foregoing the amount of cleaning means may also be determined, and if desired limited, during seat cleaning by state-of-the-art periodic actuation of the closure member involved.

Should a suitable drive unit be available, it is also generally speaking possible, that is, independently of whether the closure member involved is lifted periodically or a single time by the width of a gap from its seat surface, to move the other closure member when in its closed position, if it is in the form of a slide valve piston, in the direction of the valve housing element, conducting product if desired, either a single time or periodically, so that a part of the associated seat surface is thereby cleared and cleaned (so-called seat cleaning by "wiping").

I claim:

1. A double seat valve with cleanable seats, with two closure members (4, 5) mounted in series and movable relative to each other which prevent overflow of fluids from one valve housing element (1, 2) to another (2, 1) when the valve is in the closed position, which delimit in both the closed and the open position a leakage cavity (11) between the closure numbers, the leakage cavity being connected to the vicinity of the valve by way of a tubular shaft (4*e*; 5*c*) connected to one of the closure members (4, 5), a first of the closure members (4) being in the form a slide valve piston with an end section provided with radial sealing agents (6, 7) being received, when the valve is in the closed positions so as to effect sealing in a cylindrical valve seat surface (3*a*) of a connecting hole (3, 3*a*\*) joining the valve housing elements (1, 2) and being received during its opening movement so as to effect sealing in a recess (9) provided in a second of the closure members (5) in alignment with the cylindrical valve seat surface (3*a*) before the second closure member (5) is also transferred to the open position by the first closure member (4), and with each of the closure members (4, 5) being transferrable independently of the other closure member to a seat cleaning position for the purpose of rinsing of its seat surfaces (3*a*, 3*b*) by a partial valve stroke of the width of a gap, characterized in that the end section of the slide valve piston (4) has two radial sealing agents (6, 7) spaced axially relative to the longitudinal axis of the slide valve piston, between these two radial sealing agents there are provided in the slide valve piston (4) passage openings (4*b*) which connect the vicinity of the slide valve piston (4) on the jacket surface side to the leakage cavity (11) by way of a discharge outlet (4*a*, 4*a*\*) opening into a tubular shaft (4*e*, 5*c*), in that the two sealing agents (6, 7)

are received into the cylindrical valve seat surface (3*a*) so as to effect sealing when the double seat valve is in the closed position, as well as in the seat cleaning position of the second closure member (5), and are moved into the recess (9) in the open position where at least the sealing agent (6, 7) on the valve housing side seals against the circumferential wall of the recess (9), and in that, when the slide valve piston (4) is in the seat cleaning position, the slide valve piston is displaced by the amount of a partial valve stroke in the direction of its opening movement in such a way that the passage openings (4*b*) are open to the valve housing element (2, 1) adjacent to the cleared seat surfaces and in the process the sealing agent (7) of the slide valve piston (4) on the leakage cavity side remains in the cylindrical seat surface (3*a*) so as to effect sealing, and in that, when the second closure member (5) is in the seat cleaning position, the second closure member is displaced by the amount of a partial stroke in the direction of its opening movement, whereby the valve housing element (1, 2) adjacent to the cleared seat surface is connected with the discharge outlet (4*a*) by way of the leakage cavity (11).

2. A double seat valve with cleanable seats as described in claim 1, wherein there is mounted on one side of the slide valve piston (4) the tubular shaft (4*e*) which extends through the valve housing element (2) adjacent to the latter and receives a discharge outlet (4*a*) which extends through a slide valve piston (4) into the leakage cavity (11) and connects the latter to the vicinity of the double seat valve, and wherein there engages the slide valve piston (4) on the other side a valve rod (4*c*) which extends through the valve housing element (1) adjacent to said side and is connected to a drive unit (12) of the double seat valve.

3. A double seat valve with cleanable seats as described in claim 1, wherein there is mounted on one side of the second closure member (5) the tubular shaft (5*c*) which extends through the valve housing element (2) adjacent to the latter into the vicinity of the double seat valve and receives a discharge outlet (5*b*) which extends through the second closure member (5) into the recess (9) which forms part of the leakage cavity (11) and connects the latter to the vicinity of the double seat valve, and wherein there engages the other side of the second closure member (5) a valve rod (5*a*) which extends through valve housing element (1) adjacent to said side and is connected to a drive unit (12) of the double seat valve.

4. A double seat valve with cleanable seats as described in claim 3, wherein the cylindrical valve seat surface (3*a*) is provided internally in a seat ring (13) detachable from the valve housing elements (1, 2) and is received externally in the connecting hole (3*a*\*) joining the valve housing elements (1, 2) and there effects sealing by means of a first and a second seat ring seal (14, 15) which is mounted in the valve housing element (1) on the drive unit side and whose smallest external diameter is larger than the largest external diameter of the second closure member.

5. A double seat valve with cleanable seats as described in claim 1, wherein the slide valve piston (4) has between the sealing agent (6) on the valve housing side and the passage openings (4*b*) a cylindrical extension (4*d*) which externally forms an annular gap with the cylindrical valve seat surface (3*a*).

6. A double seat valve with cleanable seats as described in one of claim 1, wherein the second closure member (5) has on its end enclosing the recess (9) a cylindrical extension (5*d*) which externally forms an annular gap with a second valve seat surface (3*b*).

7. A double seat valve with cleanable seats as described in claim 1, wherein a part of the slide valve piston (4) receiving the sealing agent (7) on the leakage cavity side is designed to be movable relative to the rest of the slide valve piston (4) and on one side rests against the latter and on the other is forced against the second closure member (5) directly or indirectly by spring tension.

8. A double seat valve with cleanable seats as described in claim 7, wherein the part of the slide valve piston (4) receiving the sealing agent (7,6) on the leakage cavity side is connected to the drive unit (12) of the double seat valve and may be controlled from this point.

9. A double seat valve with cleanable seats as described in claim 1, wherein the sealing agents (6, 7) are configured as separate seals.

10. A double seat valve with cleanable seats as described in claim 1, wherein the sealing agents (6, 7) are produced by coating or jacketing the end section involved of the slide valve piston (4) with a suitable sealing material.

11. A double seat valve with cleanable seats as described in claim 1, wherein at least the end section of the slide valve piston (4) involved consists in its entirety of a suitable sealing material.

12. A double seat valve with cleanable seats as described in claim 17, wherein the passage openings (4*b*) in the aggregate have a passage cross-section corresponding to the rated cross-section of the largest pipe connected to the valve.

13. A double seat valve with cleanable seats as described in claim 1, wherein the discharge outlet (4*a*, 5*b*) has over its total length at least one passage cross-section corresponding to the rated cross-section of the largest pipe connected to the valve.

14. A double seat valve with cleanable seats as described in claim 1, wherein the radial extent of a circumferential wall of the recess (9) is configured in its area including the sealing agent (7,6) on the leakage cavity side when the double seat valve is in the open position so that an annular circumferential gap (10) is formed between the sealing agent (7,6) and the circumferential wall of the recess (10).

15. A double seat valve with cleanable seats as described in claim 3, wherein the annular circumferential gap (10) is connected to the vicinity of the double seat valve by way of an annular gap between the valve rod (4*c*, 5*a*) and a hollow rod (5*a*, 4*c*) enclosing this valve rod or by way of a connecting bore inside the internal valve rod (4*c*, 5*a*).

16. A double seat valve with cleanable seats as described in claim 14, wherein the sealing agent (6,7) of the slide valve piston (4) on the valve housing side is in radial, radial/axial, or axial contact with an end of the second closure member (5) enclosing the recess (9) so as to effect sealing.

17. A double seat valve with cleanable seats as described in claim 15, wherein the sealing agent (6,7) of the slide valve piston (4) on the valve housing side is in radial, radial/axial, or axial contact with an end of the second closure member (5) enclosing the recess (9) so as to effect sealing.

\* \* \* \* \*

UNITED STATES PATENT AND TRADEMARK OFFICE
CERTIFICATE OF CORRECTION

PATENT NO. : 6,178,986 B1
DATED : January 30, 2001
INVENTOR(S) : Jens Burmester

It is certified that error appears in the above-identified patent and that said Letters Patent is hereby corrected as shown below:

Column 12,
Line 34, "of" (second occurrence) should be -- contrary to --.

Signed and Sealed this

Ninth Day of April, 2002

Attest:

JAMES E. ROGAN
*Attesting Officer*   *Director of the United States Patent and Trademark Office*